US011809985B2

(12) United States Patent
Polanía Cabrera et al.

(10) Patent No.: US 11,809,985 B2
(45) Date of Patent: Nov. 7, 2023

(54) ALGORITHMIC APPAREL RECOMMENDATION

(71) Applicant: Target Brands, Inc., Minneapolis, MN (US)

(72) Inventors: Luisa F. Polanía Cabrera, Sunnyvale, CA (US); Satyajit Vishram Gupte, Sunnyvale, CA (US)

(73) Assignee: Target Brands, Inc., Minneapolis, MN (US)

( * ) Notice: Subject to any disclaimer, the term of this patent is extended or adjusted under 35 U.S.C. 154(b) by 630 days.

(21) Appl. No.: 16/778,522

(22) Filed: Jan. 31, 2020

(65) Prior Publication Data

US 2020/0257976 A1 Aug. 13, 2020

Related U.S. Application Data

(60) Provisional application No. 62/802,533, filed on Feb. 7, 2019.

(51) Int. Cl.
*G06Q 30/00* (2023.01)
*G06N 3/08* (2023.01)
*G06Q 30/0601* (2023.01)

(52) U.S. Cl.
CPC .......... *G06N 3/08* (2013.01); *G06Q 30/0631* (2013.01); *G06Q 30/0643* (2013.01)

(58) Field of Classification Search
CPC ... G06N 3/08; G06Q 30/0631; G06Q 30/0643
USPC .............................................. 705/26.1–27.2
See application file for complete search history.

(56) References Cited

U.S. PATENT DOCUMENTS

| 2005/0075145 | A1 | 4/2005 | Dvorak et al. |
| 2007/0095615 | A1 | 5/2007 | Spector |
| 2009/0037295 | A1 | 2/2009 | Saul et al. |
| 2010/0023421 | A1 | 1/2010 | Wannier et al. |
| 2013/0226839 | A1* | 8/2013 | Archambeau .......... G06N 20/00 706/12 |
| 2015/0170055 | A1* | 6/2015 | Beymer ................. G06N 20/00 706/12 |
| 2017/0083789 | A1 | 3/2017 | Shah et al. |
| 2018/0218433 | A1 | 8/2018 | Penner et al. |
| 2019/0295151 | A1* | 9/2019 | Ghadar ............... G06F 16/9038 |

OTHER PUBLICATIONS

Zhanpeng Zhang et al. (Department of Information Engineering, The Chinese University of Hong Kong), "Learning Social Relation Traits from Face Images", Computer Vision Foundation, 2015, 9 Pages.

Julian McAuley et al., "Image-based Recommendations on Styles and Substitutes", Deparlment of Computer Science, UC San Diego, School of Computer Science, University of Adelaide, Australian Centre for Robot Vision, Jun. 17, 2015, 11 Pages.

(Continued)

*Primary Examiner* — Anand Loharikar
(74) *Attorney, Agent, or Firm* — Merchant & Gould P.C.

(57) ABSTRACT

Generally, the present disclosure relates to methods and systems for algorithmically generating apparel recommendations. In some example aspects, human-identified complementarity of a subset of products can be used to train a neural network, which is in turn used to generate a compatibility score for items. Based on such values, compatible items can be identified and recommended to a user.

15 Claims, 8 Drawing Sheets

(56) References Cited

OTHER PUBLICATIONS

Wei-Lin Hsiao et al., "Creating Capsule Wardrobes from Fashion Images", University of Texas—Austin, Apr. 14, 2018, 15 Pages.

Long Chen et al., "Dress Fashionably: Learn Fashion Collocation with Deep Mixed-Category Metric Learning", The Thirty-Second AAAI Conference on Aililicial Intelligence (AAAI-18), 2018, 8 Pages.

Zeyu Cui et al., "Dressing as a Whole: Outflit Compatibility Learning Based on Node-wise Graph Neural Networks", International World Wide Web Conference Committee, 2019, 11 Pages.

Ruining He et al., "Learning Compatibility Across Categories for Heterogeneous Item Recommendation", Department of Computer Science and Engineering, University of California, San Diego, IEEE International Conference on Data Mining, 2016, 11 Pages.

Xintong Han et al., "Learning Fashion Compatibility with Bidirectional LSTMs", ACM, 2017, 9 Pages.

Mariya I. Vasileva et al., "Learning Type-A ware Embeddings for Fashion Compatibility", Department of Computer Science, University of Illinois at Urbana-Champaign, 2018, 66 Pages.

Andreas Veit et al., "Learning Visual Clothing Style with Heterogeneious Dyadic Co-occurrences", Department of Computer Science, Cornell University, Cornell Tech, Department of Computer Science and Engineering, UC San Diego, Computer Vision Foundation, 2015, 9 Pages.

Yuncheng Li et al., Mining Fashion Outfit Composition Using An End-to-End Deep Learning Approach on Set Data, Fellow—IEEE, 2017, 10 Pages.

Xuemeng Song et al., Neural Compatibility Modeling with Attentive Knowledge Distallation, Shandong University, National University of Singapore, Tencent AI Lab, Association for Computing Machinery, 2018, 10 Pages.

Ashley Sisk, Mommy & Me: Coordinating Clothing for the Entire Family, available at https://dailymom.com/shine/mommy-me-coordinating-clothing-for-the-entire-family; Dated: Sep. 17, 2014—10 Pages.

Linsey Murray, Target's Matching Outfits Are Here to Put an End to Awkward Family Photos Forever (May 9, 2018), available at https://www.goodhousekeeping.com/beauty/fashion/a20634306/target-matching-family-outfits/; Dated May 9, 2018—7 Pages.

\* cited by examiner

ALGORITHMIC APPAREL RECOMMENDATION

CROSS-REFERENCE TO RELATED APPLICATION

This application claims priority to U.S. Provisional Patent Application No. 62/802,533 filed on Feb. 7, 2019, the disclosure of which is hereby incorporated by reference in its entirety.

The present application is related to US 2019/0370879, which claims priority to U.S. Provisional Patent Application No. 62/673,653 filed on May 18, 2018, and the present application is also related to and U.S. Provisional Patent Application No. 62/912,861, filed on Oct. 9, 2019. These related applications are hereby incorporated by reference in their entirety.

BACKGROUND

Users visiting an online apparel store may browse various apparel categories to identify an item for purchase. Such users may want to purchase an item of a particular apparel category (e.g., pants or shirts), but may not browse for or be aware of other apparel items offered by the store that the user would want to purchase. In this manner the online apparel store can be unsuited to surfacing relevant content to the user.

One context in which this problem arises is in the area of "complementary" items. Complementary items are items that are not specifically associated with a selected item, but which may be fashionably worn together (e.g., based on shopping experience or expert advice). Proper identification of complimentary items is especially important in the apparel industry, where people want to combine separate, complimentary apparel items into a cohesive outfit. However, proper identification of compatible apparel items for completing an outfit is often challenging for humans, and the subjective nature of the identification poses significant challenges in automating the process with computers. Nevertheless, with the rapid evolution of the online fashion industry, systems that are able to provide compatible apparel recommendations are needed.

Because such complementary items are often difficult to identify, a server hosting the apparel store has limited ability to present users with complementary items for purchase alongside a primary item selected by that user. Thus the server is traditionally limited to recommending complimentary items that were explicitly identified as being complementary by a human curator or based on items that are often purchased together. But such a limited process for identifying complimentary items can result in both under inclusion of items within a large complementary item dataset (e.g., by relying on manual feedback regarding complementarity, which may not extend to the entire item set) or overinclusion (e.g., by identifying items purchased together but may nonetheless not be complimentary).

Others have attempted to solve issues of fashion compatibility with machine learning algorithms, such as by posing fashion compatibility as a metric learning problem, addressable with Siamese networks. In "Image-based recommendations on styles and substitutes" (IACM SIGIR Conference on Research and Development in Information Retrieval, 2015, pages 43-52), McAuley et al. used a parameterized distance metric to learn relationships between co-purchased item pairs and used convolution neural networks (CNNs) for feature extraction. In "Dress fashionably: Learn fashion collocation with deep mixed-category metric learning", (AAAI Conference on Artificial Intelligence, 2018), Chen et al. proposed a triplet loss-based metric learning method to recommend complementary fashion items.

An alternative approach to metric learning is to use recurrent neural networks to model outfit generation as a sequential process. Such an approach is described in "Learning fashion compatibility with bidirectional LSTMs," (ACM on Multimedia Conference (2017), pp. 1078-1086). In "Collaborative fashion recommendation: A functional tensor factorization approach," (ACM International Conference on Multimedia (2015), pp. 129-138), Hu et al. proposed a functional tensor factorization approach that uses discrete item attributes to recommend a set of fashion items. In "Creating capsule wardrobes from fashion images", (IEEE Conference on Computer Vision and Pattern Recognition (2018), pp. 7161-7170), Hsiao et al. proposed to create capsule wardrobes from fashion images by posing the task as a subset selection problem. In "Neural compatibility modeling with attentive knowledge distillation," (arXiv: 1805.00313 (2018)), Song et al. proposed to model compatibility using an attentive knowledge distillation scheme.

As can be seen in the above, in recent years, the problem of predicting fashion compatibility for outfit recommendation has gained popularity in the vision community. But the challenge of determining compatibly goes beyond the traditional problem of visual similarity by requiring modeling and inferring the compatibility relations across different fashion categories, as well as the relations between multiple fashion factors, such as color, material, pattern, texture, and shape. Such inferences are traditionally difficult for algorithms to compute. It is also highly subjective because fashion compatibility can vary from one person to another, which may lead to noisy labels. Despite recent advancements, there is still room to improve current outfit recommendation and compatibility scoring algorithms.

SUMMARY

Generally, the present disclosure relates to methods and systems for generation of apparel recommendations for completing an outfit given that a user is interested in a given apparel item based on apparel item compatibility items. In some example aspects, human-identified complementarity apparel is be used to train a neural network. Using the trained neural network, complementary items can be identified.

In one aspect, these is a computer-implemented method of recommending an apparel item at a retail website. The method includes: obtaining a pair of images of apparel items; providing the pair of images as input to a trained neural network; processing the pair of images with the trained neural network; obtaining a fashion compatibility score as output from the trained neural network; and recommending an apparel item at a retail website using the compatibility score. Processing the pair of images includes directly encoding correlation between embeddings. In an example, processing the pair of images with the trained neural network includes calculating a Hadamard product of the embeddings to directly encode the correlation between embeddings. In an example, processing the pair of images with the trained neural network includes incorporating color information into the network. In an example, incorporating color information into the network includes augmenting the embeddings with color histogram features obtained from the pair of images of apparel items. In an example, augmenting the embeddings includes concatenating the color histogram features with a Hadamard product of the embeddings.

In another aspect, these is a non-transitory computer-readable medium having encoded thereon a neural network configured receive input representative of a pair of apparel images and provide an output representative of a compatibility score. In an example, the neural network includes a trained first subnetwork configured to provide a pair of features as output, a combiner configured to produce a vector from the pair of features; a second subnetwork configured to forward propagate the vector; and a readout function configured to produce the output representative of a compatibility score based on an output of the second subnetwork. In an example, the trained first subnetwork includes a left branch configured to generate embeddings for a first image of the pair of apparel images; and a right branch configured to generate embeddings for a second image of the pair of apparel images. In an example, the trained first subnetwork is a siamese network. In an example, the combiner is configured to calculate a Hadamard product of the embeddings for the first image and the embeddings for the second image. In an example, the combiner is further configured to concatenate the Hadamard product with color histogram features extracted from the pair of apparel images.

In yet another aspect, there is a computer-implemented method comprising: receiving a seed item; for each respective item of a plurality of items in an item collection, determining a compatibility score between the seed item and the respective item; and providing a subset of the plurality of items recommending an apparel item at a retail website based on the compatibility score. The determining includes: providing the seed item and the respective item as a pair of images as input to a trained neural network; processing the pair of images with the trained neural network, wherein processing the pair of images includes directly encoding correlation between embeddings; and obtaining the compatibility score as output from the trained neural network.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
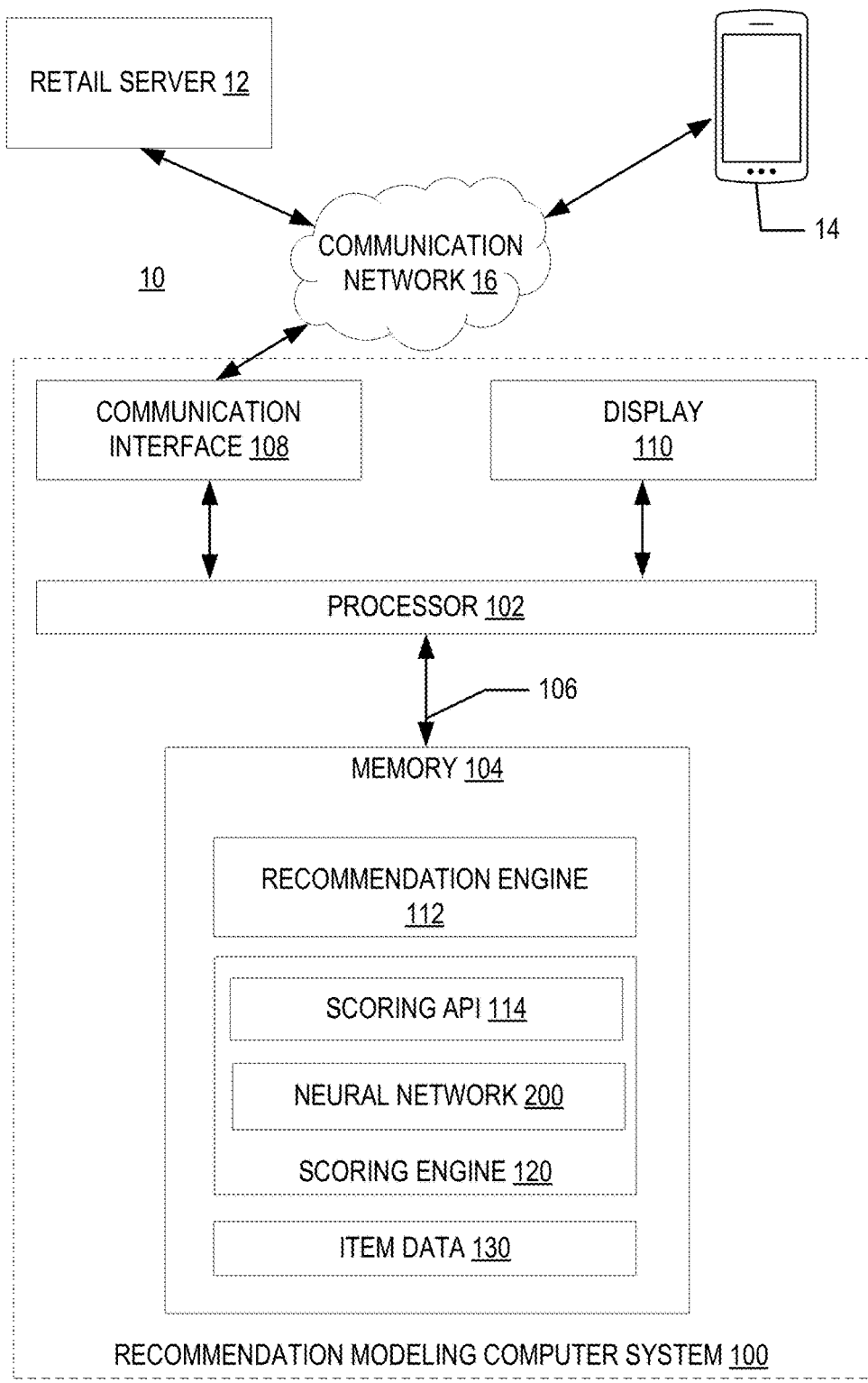
FIG. 1 illustrates a system for presenting apparel items in a networked environment based on other item selections, according to an example embodiment.

Disclosed examples include technology that can address problems in algorithmically determining fashion compatibility. Such technology provides not only a practical application to improving the functioning of such algorithms but also a practical application in algorithmically providing recommendations for complementary apparel items given a seed apparel item. Disclosed examples can include the use of a neural network trained to provide a compatibility score given a pair of images of apparel items. For instance, one image of the pair of images can act as a seed apparel item and the other image can a candidate apparel item for which compatibility with the seed apparel item will be determined. By keeping the seed apparel item constant and varying the other apparel items, techniques disclosed herein can be used to identify which apparel items of a set are most compatible with the seed apparel item. These results can be used to identify one or more apparel items that are compatible (e.g., above a compatibility threshold) with the seed apparel item and can be provided as a recommendation.

A compatibility score can be a numeric value indicating how similar the pair of images of apparel items are to pairs of training images tagged as being fashionable together in an outfit. For a sufficient quantity and quality of training data, the compatibility score is usable as a proxy for how fashionable the pair of items are together. Thus, the compatibility score can be used to algorithmically recommend apparel to form a fashionable outfit. As will be understood in the art, even fashion experts can disagree about whether a same pair of items is fashionable. Thus, determining objective fashionability from first principles is beyond the scope of the instant disclosure. Instead, it is sufficient to be able to generate a machine learning framework (e.g., a neural network) from training examples and use the machine learning framework to score pairs of items to generate a compatibility score. The notion of complementarity used in the training examples can be derived from product collections curated by merchandising partners or clothing stylists who inherently use art to determine what consumers like. Thus, the techniques disclosed herein can leverage the expertise of human curators and uses machine learning to automatically generate product recommendations that are complementary without further assistance from human curators. As a further benefit, by varying the training examples can be used to take into account different definitions of compatibility. For example, there may be multiple different machine learning frameworks trained from different sets of examples. Further, different training sets can be used for different individuals to allow for compatibility to be determined on a personal level.

In an example implementation, a siamese network is used for feature extraction followed by a fully-connected network used for learning a fashion compatibility metric. The embeddings generated by the siamese network are augmented with color histogram features. The training of the network is formulated as a maximum a posteriori (MAP) problem where Laplacian distributions are assumed for the filters of the siamese network to promote sparsity and matrix-variate normal distributions are assumed for the weights of the metric network to efficiently exploit correlations between the input units of each fully-connected layer. Then the network is trained and evaluated with a dataset of outfits collected from a socially-curated dataset of outfits.

Given that a customer is interested in a seed apparel item (which can be referred to as a query), techniques disclosed herein can be used to recommend complementary apparel items that match the seed apparel item to form a stylish outfit. For example, when a user views a blouse, the system may suggest compatible items in the categories of pants and cardigans. Disclosed examples can use one or more siamese networks for feature extraction and can calculate the compatibility score using a fully-connected (FC) network. The FC network has the potential to generate more complex compatibility functions beyond distance metrics, such as Euclidean or Mahalanobis metrics. A simple approach to merge the image embeddings generated by the siamese network is to use concatenation. But disclosed examples can go beyond mere concatenation and use the Hadamard product to directly encode correlation between the embeddings and therefore help the network learn a compatibility metric. Additionally, disclosed examples can incorporate color information into the network. Advantageously, the incorporation of color information can mean that the CNN need not be completely relied on to learn the color features that are relevant for fashion compatibility.

Color can be useful in determining compatibility between fashion items. Disclosed examples can explicitly incorporate color information in the feature extraction process and exploit correlations between the feature representations. The MAP approach used for training can promote sparsity of the weights of the CNN and readout function and allows the metric network to exploit correlations between the input units of the layers. In terms of network training, disclosed examples can use a MAP approach. A Laplacian distribution, which promotes sparsity, can be used to model the CNN filters. Disclosed examples need not impose any constraints on the column covariance of the distribution and therefore. Without such constraints, disclosed examples can more effectively capture the correlations between the input units of each FC layer compared to, for example, implementations where the matrix-variate normal distribution with unit row and unit column covariance matrices is assumed for the weights of the FC layer that follows the siamese network.

Disclosed techniques for determining a compatibility score can be used to improve the functioning of computer systems for providing recommendations to users. For instance, an apparel retail site or application can provide recommendations to users based on a seed apparel item (e.g., an apparel item being currently presented to a user by the retail site). While the apparel retail site is presenting a shirt to a user, the site can present additional items from other apparel categories (e.g., pants or sweaters) that may be of interest to the user. Such implementations provide for improved complementary item recommendations within a site automatically, and therefore do not require a user to exhaustively identify items that are complementary to each item, and need not rely on false proxies for item complementarity, such as items that are purchased together. Therefore, improved performance in identifying complementary items over an entire item collection can be provided, which saves significant time in generating such items while also improving accuracy in item identification. Because of this, and because large item collections offered by a retailer are in a state of constant change, complementary item identifications can be performed on an automatic or semi-automatic, periodic basis (or at the time of item selection) to ensure that complementary item collections are up to date and available for any particular item selection.

In an example implementation of the technology, there can be a site (e.g., a website) or application by which a user can upload their wardrobe and the compatibility score can be used to recommend existing outfits for the user to wear, as well as new apparel items that the user can purchase that would complement what the user already owns.

In many examples herein, a machine learning framework is trained to learn item representations that capture complementarity. The complementarity can be a value that is generated based on a pair of items, with the model classifying that pair of items in a binary fashion as complementary or not complementary. In other examples, the complimentary can be a value that expresses a degree of compatibly, such as a number between 0.0 and 1.0, where values closer to 1.0 are relatively more compatible and values closer to 0.0 are relatively less compatible. Methods and systems for generating a set of one or more complementary items associated with an item is also disclosed.

System for Providing Apparel Recommendations in an Online Environment

FIG. 1 illustrates a system 10 for presenting apparel items in an online environment based on an item selection, according to an example embodiment. The system 10 includes a recommendation modeling computing system 100 communicatively connected to a retail server 12 via a communication network 16 (e.g., the Internet). The retail server 12 provides items to a user device 14 connected to the communication network 16 for presentation to a user. The user device 14 displays the presented items to the user, such as via a webpage rendered in a web browser or as part of another application of the user device 14.

The recommendation modeling computing system 100 includes a processor 102 communicatively connected to a memory 104 via a data bus 106. The processor 102 can be one or more processors of any of a variety of types of programmable circuits (e.g., a central processing unit) capable of executing computer-readable instructions to perform various tasks, such as mathematical and communication tasks.

The memory 104 includes any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components.

The recommendation modeling computing system 100 can also include a communication interface 108 configured to receive and transmit data, for example to access data in an external database, or to provide item recommendations to the retail server 12 for presentation to the user device 14. Additionally, the recommendation modeling computing system 100 can include a display 110 for presenting recommendation information.

In the embodiment shown, the memory 104 stores a recommendation engine 112, a scoring engine 120, and item data 130.

The recommendation engine 112 is a set of instructions executable by a processor to cause execution of a program that operates to generate recommendations of apparel, such as by providing recommended apparel to the retail server 12 for display to a user visiting a clothing retail website hosted by the retail server 12. In an example, the recommendation engine 112 can receive as input an identifier of a seed apparel item of a particular apparel category from the retail server 12 and generate recommendations for apparel items from other categories that complement the seed apparel item as output to the retail server 12. These recommendations can leverage the scoring engine 120 and the item data 130 in providing one or more recommendations. For instance, the recommendation engine 112 can identify apparel items having high compatibility scores as determined by the scoring engine and provide the identified apparel items to the retail server 12 for display to a user.

The recommendation engine 112 can analyze data, such as the item data 130, to determine relationships among items to identify items to be recommended. This can include, for example, identifying apparel items that are complementary to other items that have been or may be selected by a user. For instance, two apparel items can be deemed compatible if a compatibility score of the items is greater than a predetermined threshold. In examples, the recommendation engine 112 incorporates apparel item descriptions or other information that describes an item into the analysis.

The recommendation engine 112 can expose an Application Programming Interface (API). The API of the recommendation engine 112 can be a set of routines defined by the recommendation engine 112 and exposed to other systems and processes to cause the recommendation engine 112 to take particular actions, such as return a list of recommended items that are compatible with a seed item. For instance, there may be a routine made accessible by the API 114 that allows the retail server 12 to request, based on a seed apparel item, recommended items that are fashionably compatible with the seed apparel item. The API can respond with a listing of a plurality of items in various formats (e.g., via XML or similar markup language document). The listing can indicate apparel items to be recommended to a user in accordance with operation of the recommendation engine 112, as discussed below.

The item data 130 is data regarding apparel items. In many examples, the item data 130 is a database of apparel items available for sale via the retail server 12. The entries of the item data 130 can each represent an apparel item and be stored in conjunction with data regarding the apparel item, such as a category of the apparel item, a price, and an item description, among other data. In some examples, this data regarding the apparel item is stored in a data store associated with the retailer. In some examples, data, such as the apparel category, can be determined using a machine learning framework (e.g., a machine learning framework configured to produce a category as output based on an input image).

The scoring engine 120 can be a set of instructions executable by a processor to cause execution of a program that takes at least two items of apparel as input and returns a compatibility score. In the illustrated example, the scoring engine 120 includes a scoring API 114 and a neural network 200

The scoring API 114 can be a set of routines defined by the scoring engine 120 and exposed to other systems and processes to cause the scoring engine 120 to take particular actions. For instance, the scoring API 114 can include an API that receives a pair of apparel items as input, generates a compatibility score of the pair of apparel items using the neural network 200, and return the compatibility score as output.

The neural network 200 is a machine learning neural network. The neural network 200 is configured to take a pair of images of apparel items as input and provide a fashion compatibility score as output. An example implementation of the network 200 is shown and described in relation to FIG. 2.

Figure 2:
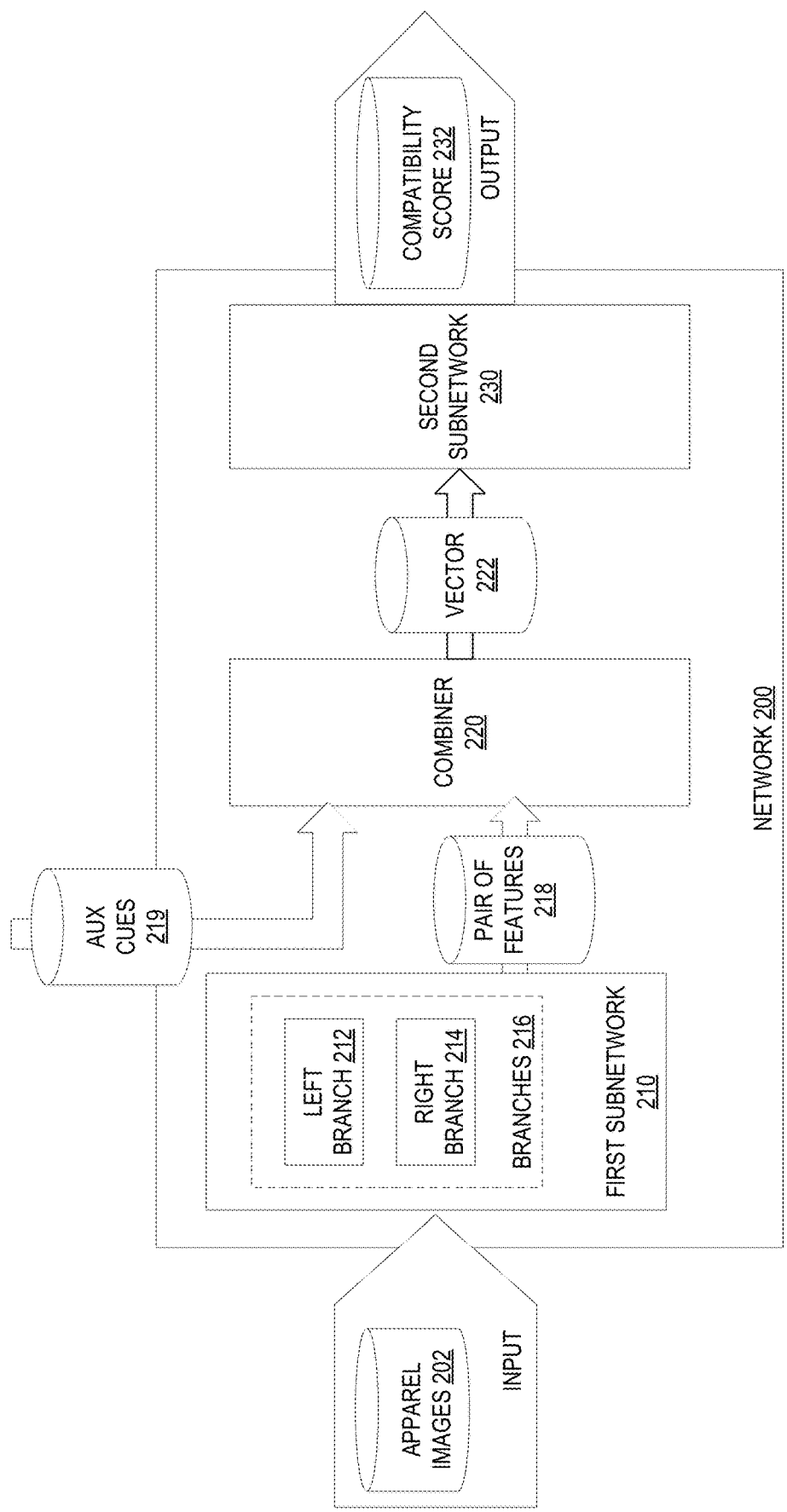
FIG. 2 illustrates an example implementation of a neural network, according to an example embodiment.

In addition to or instead of the neural network structure described in FIG. 2, the neural network 200 can include a graph-based approach. For example, a graph can include multiple nodes, each corresponding to an apparel item, and neighboring nodes can represent an outfit. The connections between the nodes can be learned as part of the training process. At each training iteration, massages can be passed between the nodes and updates can be made. In an example, gated recurrent units can be used to update hidden states of the nodes. The functions can have hidden or fully-connected layers, among other arrangements. A linear combination of messages can be used to form a final prediction of fashion compatibility. In an example implementation, all nodes in the graph share a same weights.

In examples, the scoring engine 120 can include instructions usable to generate or train the neural network 200 from training data. For example, the scoring engine 120 can generate a neural network 200 based on, for example, input regarding known complementary apparel items and apparel item data, such as training example data sets obtained from human curators.

In example implementations, the scoring engine 120 receives one or more item selections (e.g., via the scoring API 114), and generates (using the neural network 200) identifications of one or more items determined to be complementary to the selected item or a compatibility score of two or more items. The one or more complementary items may be items meeting or exceeding a threshold score of complementarity to the selected, or seed, item. The recommendation modeling computing system 100 can provide the collection of complementary items, or to a retail server 12 (e.g., for delivery to a user device 14 in response to a request from that device). Example user interfaces for providing such recommendations are provided in greater detail below in association with FIG. 7.

Neural Network Structure

FIG. 2 illustrates an example implementation of the neural network 200 that receives a pair of apparel images 202 as input and provides a compatibility score 232 as output. The input can, but need not, include the apparel images formatted as an image file (e.g., in the PNG, JPG, or BMP format). In many examples, the pair of apparel images 202 can be provided as input in a modified format for processing by the network 200. For instance, the pair of apparel images 202 can be provided as an array of values representing the apparel images.

The illustrated configuration of the neural network 200 has a first subnetwork 210 and a second subnetwork 230 that are jointly learned in an end-to-end fashion.

The first subnetwork 210 is configured to map the pair of apparel images to a pair of features 218. In an example, the first subnetwork 210 is a siamese subnetwork. The first subnetwork 210 has a left branch 212 and a right branch 214 that can be referred to collectively as branches 216. The branches 216 can be neural networks that have shared weights. In an example, the branches 216 are each implemented as identical truncated VGG-16 networks, such as is described in "Very deep convolutional networks for largescale image recognition", arXiv:1409.1556 (2014), which is incorporated herein by reference. The branches 216 can be truncated by having fully-connected (FC) layers excluded. The embeddings generated by the first subnetwork 210 are merged using a combiner 220. In an example, the combiner 220 is an algorithm configured to calculate the Hadamard product of input to directly encode the correlation between embeddings. This merging strategy simulates an adaptive weighted cross-correlation technique. See, e.g., "Robust stereomatching using adaptive normalized cross-correlation", IEEE Transactions on Pattern Analysis and Machine Intelligence, vol. 33, no. 4, pp. 807-822 (2011), which is incorporated herein by reference. In other examples, the combiner can combine data via concatenation.

The combiner 220 can also combine aux cues 219 with the combined pair of features 218 (e.g., with the Hadamard product of the combined pair of features 218). In an example, the aux cues 219 include data regarding color histogram features relating to the pair of input images 202. For example, the aux cues 219 can include the Hadamard product of color histogram features extracted from the pair of input images 202. In an example, color data can be extracted from the color histogram, such as via average or concatenation. In yet another example, color can be extracted via a binning process. For instance, a three-dimensional (red, green, and blue dimensions) histogram data can be obtained using eight bins for each color to produce an 8×8×8 histogram.

In addition or instead of the color information, the aux cues 219 can include category information regarding the apparel images 202. For example, an embedding can be created from the categories of the apparel images 202. Each possible combination of categories of apparel items in the apparel images 202 can be assigned to a different value as part of the embedding (e.g., a combination of shirt and pants can have a value of one and a combination of shirt and skirt can have a value of two).

The combiner 220 can concatenate the aux cues 219 with the Hadamard product of the pair of features 218 from the first subnetwork. The resulting vector 222 can be forward-propagated through the second subnetwork 230.

The second subnetwork 230 is configured to map the pair of features identified by the first subnetwork (e.g., in the form of the vector 222, which may in some examples may incorporate the aux cues 219) to a fashion compatibility score 232. In an example, the second subnetwork 230 is an FC metric sub-network and includes a readout function (e.g., a linear regression) to compute the compatibility score 232. In an example, the compatibility score 232 is a value between 0.0 and 1.0 where values closer to 1.0 indicate a relatively higher level of compatibility and values closer to 0.0 indicate a relatively lower level of compatibility. In other examples, the compatibility score 232 can be a single value that indicates whether the items are compatible or not (e.g., a Boolean value or just the integers 0 or 1).

Training the Neural Network

The neural network 200 can be trained in any of a variety of ways. The first subnetwork 210 can be trained on an image database, such as IMAGENET. In an example, there are N training input image pairs denoted as $I=\{(I_r, I_l)_i\}_{i=1}^{N}$, where $I_r$ and $I_l$ denote the inputs to the left branch 212 and the right branch 214, respectively. Binary labels can be denoted as $Y=\{y_i\}_{i=1}^{N}$, where $y_i$ is has a value of 1 if the input pair $(I_r, I_l)_i$ is fashion compatible and a value of 0 otherwise. The output of the last FC layer of the second subnetwork 230 can be denoted as $x_i$ when the pair $(I_r, I_l)_i$ is used as input. The readout function $\Gamma(\cdot)$ can take the form:

$$\hat{y}_i = \Gamma(x_i) = w^T x_i + \epsilon,$$

where w represents the weights of the readout function and $\epsilon$ has a standard logistic distribution. Batch normalization layers can be applied after each FC layer of the second subnetwork 230.

Even though the first subnetwork 210 has two sets of weights $\Theta_r$ and $\Theta_l$ for the left branch 212 and the right branch 214, respectively, the weights can be simply referred to as $\Theta$ because the weights are mirrored (i.e., $\Theta=\Theta_r=\Theta_l$). These can be a subset of $\Theta$ that can correspond to the S filters selected for fine-tuning. The subset of $\Theta$ can be designated as $\Theta_s = \{\Theta_t\}_{t=1}^{S}$. There can also be a set of weights of the FC metric sub-network. The weights of the FC metric sub-network can be defined as:

$$W = \{W_j \in \mathbb{R}^{P_j \times Q_j}\}_{j=1}^{M}$$

The weights of the FC metric sub-network can be modeled with a matrix-variate normal distribution of zero mean. This can be expressed as:

$$W_j \sim MN(0, \Lambda_j, \gamma_j^2 I), \forall j$$

where $0 \in \mathbb{R}^{P_j \times Q_j}$ is a zero matrix, $\gamma_j^2 I \in \mathbb{R}^{P_j \times P_j}$, the row covariance, is a diagonal matrix with diagonal elements $\gamma_j^2$, and $\Lambda_j \in \mathbb{R}^{Q_j \times Q_j}$ is the positive semi-definite column covariance matrix, which can be learned in order to capture correlations between the layer input units. Let $\Lambda = \{\Lambda_j\}_{j=1}^{M}$ be the set of column covariance matrices.

The network 200 can be trained by solving the following MAP problem:

$$\hat{\Theta}_s, \hat{W}, \hat{\Lambda}, \hat{w} = \underset{\Theta_s, W, \Lambda, w}{\arg\max} \, p(\Theta_s, W, \Lambda, w | I, Y),$$

$$\propto p(Y | I, \Theta_s, W, w) \times p(W | \Lambda) \times p(\Theta_s) \times p(w).$$

where $p(Y|I, \Theta_s, W, w)$ is the likelihood probability while the last three terms ($p(W|\Lambda)$, $p(\Theta_s)$, $p(w)$) are prior probabilities. Given that the noise in has a logistic distribution, the probability distribution of $y_i$ given $x_i$ is Bernoulli, and therefore the likelihood is:

$$p(Y | I, \theta_s, W, w) \propto \prod_{i=1}^{N} p(y_i = 1 | x_i)^{y_i} (1 - p(y_i = 1 | x_i))^{(1-y_i)}$$

Where $p(y_i=1|x_i)=r(w^T x_i)=1/(1+\exp\{-w^T x_i\})$ and where $r(\cdot)$ is the sigmoid function.

Each entry of the vectors in the set $\Theta_s$ and each entry of w can be modeled with a Laplacian distribution of zero mean and variance $\sigma_i^2$, in the case of $\theta_i$, and variance $\sigma_w^2$, in the case of w. The motivation for using a Laplacian distribution is to promote sparsity. Since $W_j$ is modeled by a matrix-variate normal distribution with zero mean, the prior probability $p(W|\Lambda)$ takes the form:

$$p(W | \Lambda) = \prod_{j=1}^{M} p(W_j | \Lambda_j) = \prod_{j=1}^{M} \frac{\exp\left(-\frac{1}{2} tr\left((\gamma_j^2 I)^{-1} W_j \Lambda_j^{-1} W_j^T\right)\right)}{(2\pi)^{\frac{P_j Q_j}{2}} |\gamma_j^2 I|^{\frac{P_j}{2}} |\Lambda_j|^{\frac{Q_j}{2}}}$$

where $tr(\cdot)$ and $|\cdot|$ denote the trace and determinant of a matrix, respectively.

Replacing equations and Laplacian priors for w and $\Theta_s$, setting the variance parameters $\sigma_w$, $\{\sigma_t\}_{t=1}^{S}$, and $\{\gamma_j\}_{j=1}^{M}$ to 1 for simplicity purposes, removing constant terms, and taking the negative logarithm leads to the following optimization problem:

$$\hat{\Theta}_s, \hat{W}, \hat{\Lambda}, \hat{w} = \underset{\Theta_s, W, \Lambda, w}{\arg\max} - \sum_{i=1}^{N} [y_i \ln(r(w^T x_i)) + (1-y_i)\ln(1-r(w^T x_i))] +$$

$$\sum_{i=1}^{M} tr(W_j \Lambda_j^{-1} W_j^T) + \sum_{j=i}^{M} Q_j \ln|\Lambda_j| + \sum_{t=1}^{S} \|\theta_t\|_1 + \|w\|_1$$

The third summation term is concave while the other terms are jointly convex with respect to all variables. Learning $\Lambda_j$, $\forall_j$ directly is a convex-concave problem. Replacing $Q_j \ln|\Lambda_j|$ by the constant $tr|\Lambda_j|=1$ is adopted. So the problem (7) can be reformulated as:

$$\hat{\Theta}_s, \hat{W}, \hat{\Lambda},$$
$$\hat{w} = \underset{\Theta_s, W, \Lambda, w}{\arg\max} - \sum_{i=1}^{N} [y_i \ln(r(w^T x_i)) + (1-y_i)\ln(1-r(w^T x_i))] +$$

$$\lambda_1 \sum_{i=1}^{M} tr(W_j \Lambda_j^{-1} W_j^T) + \lambda_2 \sum_{t=1}^{S} \|\theta_t\|_1 +$$

$$\lambda_3 \|w\|_1 \text{ s.t. } \Lambda_j \succeq 0, tr|\Lambda_j|=1, \forall j,$$

where $\lambda_1$, $\lambda_2$, are regularization parameters, which are incorporated to tune the strength of the regularization terms, and are estimated using grid search. The constraint $\Lambda_j \succeq 0$ comes from the positive semi-definite property that covariance matrices need to satisfy. AN alternating optimization procedure is used to solve the equation. First, the filters $\Theta_s$ and w and the weight matrices W are updated using stochastic gradient descent while the covariance matrices $\Lambda$ are kept fixed. Second, the covariance matrices $\Lambda$ are updated, while keeping all other parameters fixed by using:

$$\bar{\Lambda}_j = \frac{(W_j^T W_j)^{1/2}}{tr((W_j^T W_j)^{1/2})} \forall j,$$

Which is the closed-form substitution of:

$$\min_{\Lambda_j} tr(W_j \Lambda_j^{-1} W_j^T) \text{ s.t. } \Lambda_j \succeq 0, tr|\Lambda_j|=1$$

Using the foregoing, a plurality of training examples can be used to train the neural network 200. Once trained and sufficiently validated, the neural network 200 can be used to calculate a compatibility score 232 in production.

Calculating Compatibility Score

Figure 3:
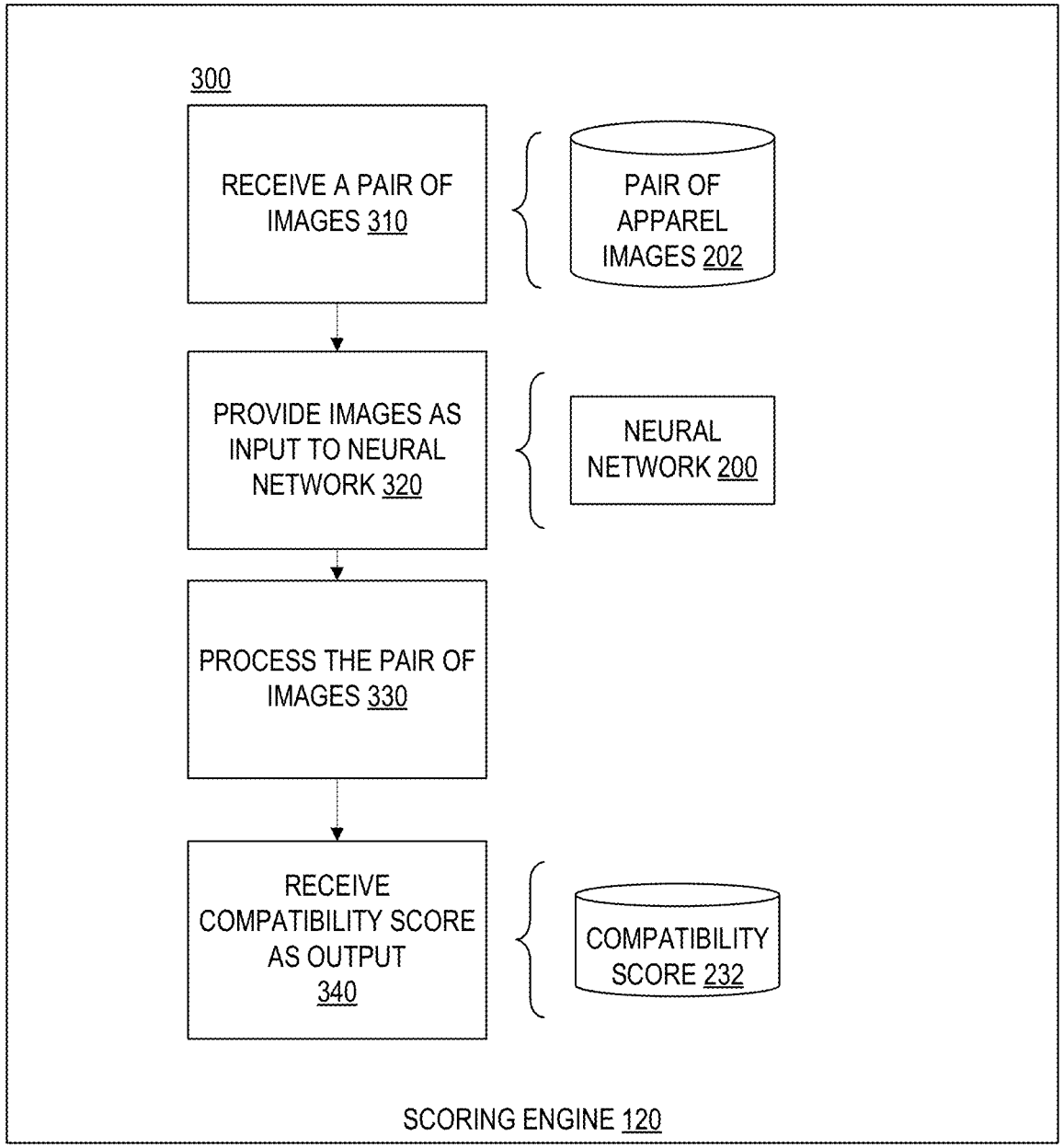
FIG. 3 illustrates a process for calculating a compatibility score of two apparel items.

FIG. 3 illustrates a process 300 for calculating a compatibility score of two apparel items. This process 300 is described in relation to the neural network 200, but can be used with any of a variety of different neural networks or machine learning models that can receive two or more apparel images as input and provide, as output, an indication of compatibility of the two or more apparel images. The process begins with operation 310.

At operation 310, a pair of apparel images 202 is received. The apparel images are images of an item of apparel. The pair of apparel images 202 can be received in any of a variety of ways. In an example, the pair of apparel images 202 is provided over the scoring API 114 as URIs (uniform resource identifiers) of locations of each of the pair of apparel images 202. Each of the images can be processed or checked to ensure compatibility with the neural network 200 (e.g., resized, padded, color corrected, converted to a different format, etc.). Following operation 320, the flow of the process 300 moves to operation 320.

At operation 320, the pair of apparel images 202 is provided as input to the neural network 200. In many examples, each of the pair of apparel images 202 is converted to a format suitable for processing with the neural network 200, such as an array. The pair of apparel images 202 is then provided as input to the neural network 200. Following operation 320, the flow of the process 300 moves to operation 330.

At operation 330, the pair of apparel images 202 is processed by the neural network 200. In an example, a first image of the pair of apparel images 202 is provided to the left branch 212 of the first subnetwork 210 of the network 200 and a second image of the pair of apparel images 202 is provided to the right branch 214 of the first subnetwork 210 of the network 200. Thus, the pair of apparel images 202 is processed by respective branches 216 to form a pair of extracted features. The extracted features can then be provided as input to the second subnetwork for the generation of a compatibility score. Optionally, aux cues are obtained and then provided with the pair of features as input to the second subnetwork 230.

At operation 340, the compatibility score 232 is obtained as output from the neural network 200. For example, as part of the processing in operation 330, the neural network 200 can provide the compatibility score 232 as output. The compatibility score 232 can be used for any of a variety of useful purposes, including the automatic recommendation of apparel items matching a given item. Examples of such uses are described in FIG. 6, below.

Experiment

An experiment was conducted to test the approach proposed above. The training was conducted on a dataset collected from a popular fashion website where users created and uploaded outfit data. The collected dataset included 13,947 outfits. These outfits were divided into a set of 10,650 for training, a set of 1,902 for validation, and a set of 1,395 for testing. Items in the training set do not belong to the testing set and vice versa. The outfits were filtered to keep only the apparel categories that fall into the following categories: bottoms, tops, dresses, gowns, suits, and outwear. In addition, outfits having fewer than two items were removed from the dataset. Examples of outfits after filtering are shown in FIG. 4.

Figure 4:
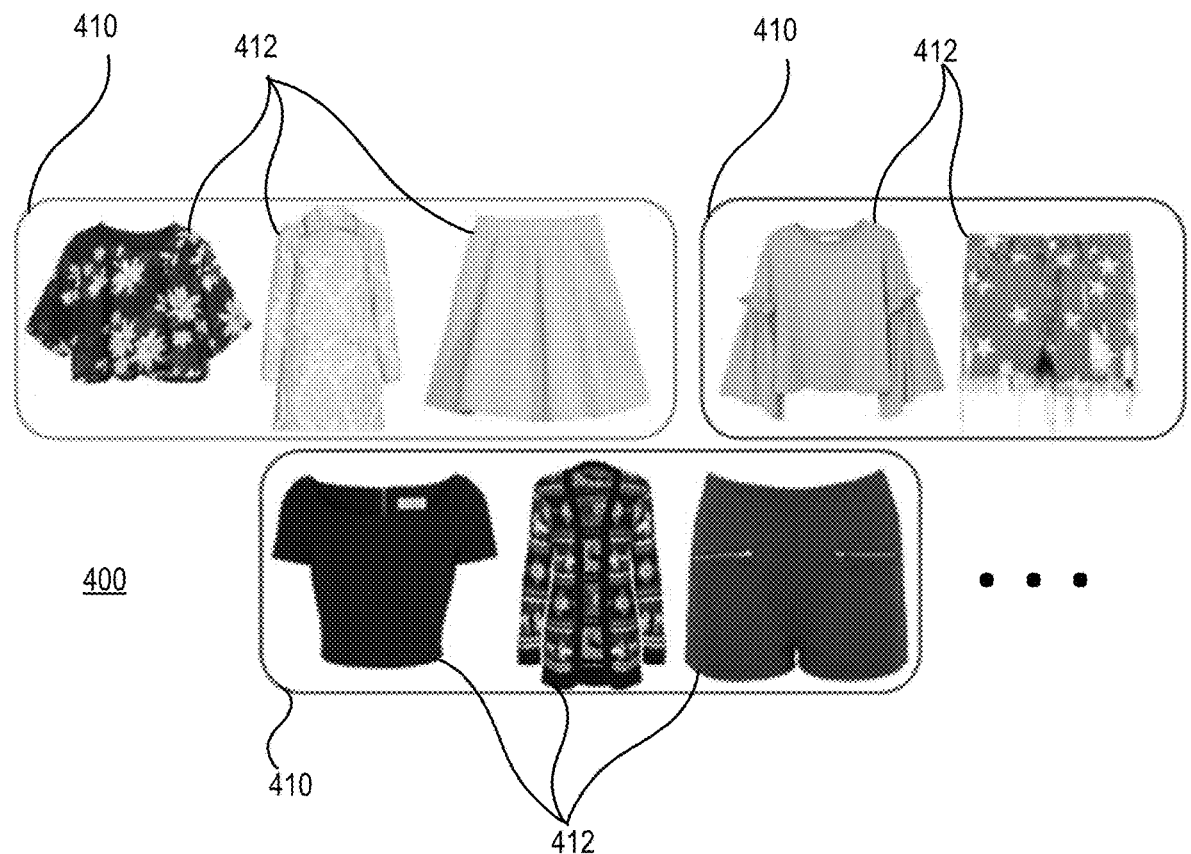
FIG. 4 illustrates an example portion of a dataset, according to an example embodiment.

FIG. 4 illustrates an example portion of a dataset 400. The illustrated portion includes three separate outfits 410. Each outfit includes two or more apparel items 412.

Positive training and validation pairs were built by forming all the possible pair combinations between apparel items belonging to the same outfit. Negative training and validation pairs were built by randomly sampling items from different outfits. However, there is no guarantee that the random sampling would lead to true negatives (e.g., two items may be from different outfits, but may nonetheless be judged to be fashionable together). Therefore, many more negatives than positives were sampled to compensate for the noise in the labels. The over-sampling factor was set to six.

For each outfit in the testing set, a seed item is defined as the first item of the outfit. For each of the remaining categories in the outfit, the proposed network generates compatibility scores between the seed item and all the items from the collected dataset which belong to that category.

The Adam Optimizer (described in "Adam: A method for stochastic optimization", arXiv:1412.6980 (2014), incorporated herein by reference) with a base learning rate of $1 \times 10^{-4}$ and with default momentum values $\beta_1=0.9$ and $\beta_1=0.999$ was used for training with 64 samples per mini-batch. The weights of the first 10 convolutional layers of a truncated VGG-16 net were kept frozen during training. Training stopped when the loss on the validation set stopped decreasing. ReLU were used as activation functions for the layers in the metric network. For the color histogram, 8 bins were used. The second subnetwork 220 was implemented as a metric network having two FC layers with 256 and 64 hidden units for the first and second layers, respectively.

The performance of the proposed network was compared with the following techniques:

| Method | Description |
| --- | --- |
| M1 | Siamese network formed by two identical VGG-16 nets (only convolutional part) pre-trained on IMAGENET. Fashion compatibility scores were generated by computing the Euclidean distance between the siamese embeddings. |
| M2 | The proposed network without explicitly incorporating color information in the form of color histograms. |
| M3 | The proposed network but replacing the Hadamard product with concatenation. |
| M4 | Fashion compatibility score generated by calculating the Euclidean distance between the color histogram of the input images |
| M5 | Fashion compatibility score generated by calculating the Euclidean distance between the histogram of oriented gradients features of the input images. The feature extraction uses 8 orientations and 15 × 15 pixels per cell. |
| M6 | The siamese architecture proposed in "Learning visual clothing style with heterogeneous dyadic co-occurrences," ((IEEE International Conference on Computer Vision (2015) pp. 4642-4650) which uses the Euclidean distance between the learned embeddings. The trained model made publicly available by the authors is used for performance comparison. |

Let $\{\psi_n\}_{n=1}^{N_t}$ be the testing set, where $\psi_n$ is formed from the seed item (first item in the outfit, which can also be referred to as a "query item"), which is denoted as $q_n$, and $C_n$ $$\{o_n^{(c)}\}_{c=1}^{C_n},$$

complimentary items, denoted as which belong to $C_n$ different apparel categories. Let $R_n^c(K)$ denote the top K recommendations generated by the proposed network for the complimentary item in category c, given query $q_n$. To generate $R_n^c(K)$ pairs are first formed between the seed item and all the rest of the items in the dataset that belong to category c, then the items with the top K fashion compatibility scores are selected to form $R_n^c(K)$. The precision@K for outfit $\psi_n$ is $$\text{precision}@k(\psi_n) = \frac{1}{C_n}\sum_{i=1}^{C_n} 1[o_n^i \in R_n^c(K)],$$

Where 1[•] denotes the indicator function. The average of the precision@K across the $N_t$ testing outfits is referred to as the average precision@K. The recommendation performance of a model is evaluated using the lift of average precision@K, which is defined as:

$$\text{Lift}@K = \frac{\text{average precision}@K \text{ (model)}}{\text{average precision}@k \text{ (random)}},$$

Where average precision@K (random) is that of a recommender that would select items at random for each of the apparel categories of interest.

The results of the experiment are shown below in table 1.

| Performance Metric | Proposed Model | M1 | M2 | M3 | M4 | M5 | M6 |
| --- | --- | --- | --- | --- | --- | --- | --- |
| Lift@3 | 8.67 | 3.34 | 7.09 | 3.51 | 5.54 | 2.9 | 2.96 |
| Lift@7 | 5.43 | 2.01 | 4.8 | 3.38 | 3.33 | 2.08 | 2.49 |
| Lift@12 | 4.42 | 1.61 | 3.95 | 2.89 | 2.57 | 1.65 | 2.03 |

Experimental results are shown in Table 1. By comparing the performance of the proposed model with that of M2, it is clear that explicitly adding color information leads to performance gains, which is probably not surprising since the Lift@K, K=3, 7, and 12, attained by M4 suggests that using color alone already offers a significant lift. However, recommending items based on the Euclidean distance between color histograms would lead to recommending monochromatic out-fits most of the time. The proposed network outperforms that described in "Learning visual clothing style with heterogeneous dyadic co-occurrences" (IEEE International Conference on Computer Vision (2015), pp. 4642-4650), probably largely due to the metric network, which generates more powerful non-linear metric functions compared to the Euclidean distance. As suggested by the results of M5, histogram of oriented gradients features do not play as important role as color features at determining fashion compatibility. The comparison of the performance of the proposed model with that of M1 emphasizes the gains attained by jointly fine tuning the truncated VGG-16 and learning the weights of the metric network. The lift attained by M3 is lower than that of the proposed method, which suggests that the Hadamard product leads to performance gains by efficiently exploiting correlations between the embeddings.

Figure 5:
FIG. 5 illustrates example model predictions for complementary items with the highest (shown in dashed boxes) and lowest (shown in dotted boxes) compatibility scores with respect to the seed item (shown in dot-dashed boxes).

Ten seed items were selected from the testing outfits to visually evaluate the performance of the model. FIG. 5 illustrates example model predictions for complementary items with the highest (shown in dashed boxes) and lowest (shown in dotted boxes) compatibility scores with respect to the seed item (shown in dot-dashed boxes). The complementary categories are the same as in the original testing outfit. Results suggest that the network learns color and style relations between apparel categories that lead to stylish outfits to a good extent. Items with the highest compatibility score tend to have either neutral colors (e.g., white and black) or match the colors of the seed item. Also, they tend to be either unicolor or contain low-key patterns.

Thus, as demonstrated in the experiment, the techniques disclosed herein are relevant to improvements in the determining of fashion compatibility and the selection of compatible items based on a seed apparel item.

Recommending Apparel Based on Seed Apparel Item

Figure 6:
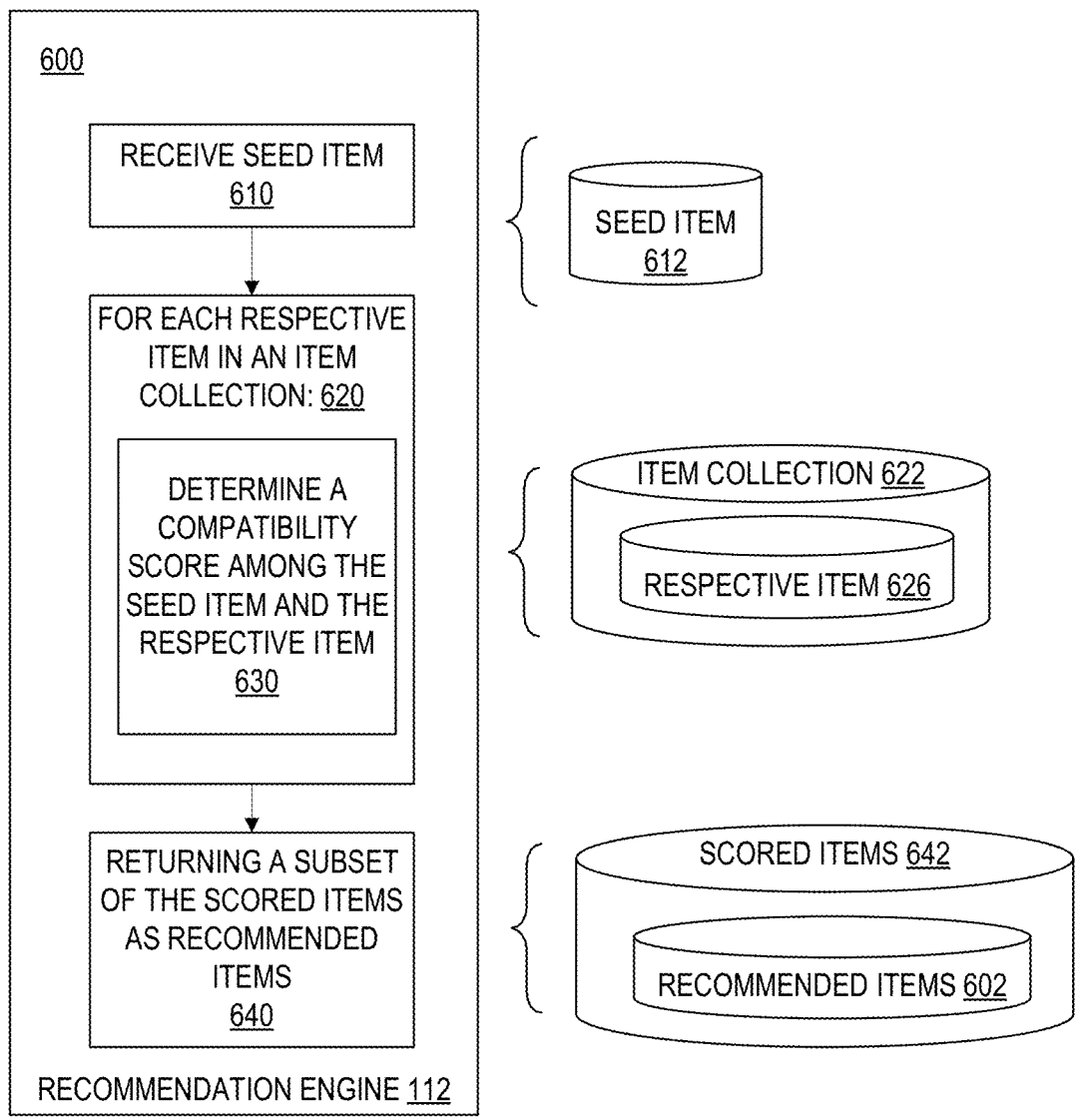
FIG. 6 illustrates a process for providing recommended items based on a seed item, according to an example implementation.

FIG. 6 illustrates a process 600 for providing recommended items 602 based on a seed item 612. The process includes and begins with operation 610.

Operation 610 includes receiving the seed item 612. The seed item 612 is an apparel item on which the recommended items 602 are to be based. In examples, the seed item 612 is an identifier of an apparel item. In other examples, the seed item 612 is an image of an apparel item. In many examples, the seed item 612 is received as input (e.g., as part of an API call) from the retail server 12. For instance, while providing a page to a user, the retail server 12 can provide an identifier of an item being described by the page (e.g., the page can be a product web page selling an item of apparel). The page can send an identifier of the item of apparel to the recommendation engine 112 to receive the recommended items 602 with which to display with the item of apparel. In this example, the identifier of the item of apparel is the seed item 612. Following operation 610, the flow of the process 600 can move to operation 620.

Operation 620 includes performing operation 630 for each respective item 624 in an item collection 622. The item collection 622 is a collection of items of apparel. In many examples, the item collection 622 is a data structure (e.g., a list or an array) storing a plurality of identifiers of items of apparel. The item collection 622 can be obtained from the item data 130. In an example, the item collection 622 is a subset of items of apparel from the item data 130 selected based on the seed item 612. For example, the item collection 622 can be selected as items in the item data 130 that are of an apparel category other than the apparel category of the seed item. For instance, where the seed item 612 is a pair of pants (e.g., being in a "pants" or "bottoms" apparel category), the item collection 622 can be apparel items from categories including tops, outerwear, accessories, shoes, and other categories different from the category to which the pair of pants is classified. This can help increase the relevance of the recommended items 602 because a user shopping for items of one category (e.g., pants) likely would not want to be recommended items from the same category that fashionably match the seed item 612. In other words, a user viewing a pair of pants would likely rather be recommended matching shirts than matching pants. In some examples, a rule-based approach can prevent incompatible categories from being suggested (e.g., an item from a skirt category being suggested as being compatible with an item from a dress category). In other examples, the neural network 200 can be expressly trained to treat certain pairs as being incompatible because of their categories.

Operation 630 includes determining a compatibility score 232 of the seed item 612 and the respective item 624. The compatibility score can be determined using the neural network 200 using the process 300. For example, an image associated with the seed item 612 and an image associated with the respective item 624 are combined to form the pair of images 202 and fed into the neural network 200 to obtain the compatibility score 232. The images can be obtained in any of a variety of ways. For example, an image can be looked up and obtained from a data store using an identifier of the seed item 612 and an identifier of the respective item 624.

After completing operation 620, there will be a collection of scored items 642 and the flow of the process can move to operation 640.

Operation 640 includes returning a subset of the scored items 642 as the recommended items 602. The scored items 642 will likely have a range of scores ranging from completely incompatible to completely compatible with the seed item 612. The subset can be selected as the items having the top N highest scores, where N is an integer. The value of N can be fixed or variable. For instance, the retail server 12 can send the seed item 612 with a request for a certain number of recommended items, and N can be set to that certain number. Returning the recommended items 602 can include sending identifiers of the recommended items 602 to the retail server 12. The retail server 12 can then provide the recommended items 602 for display at the user device 14.

Retailer Interface

Figure 7:
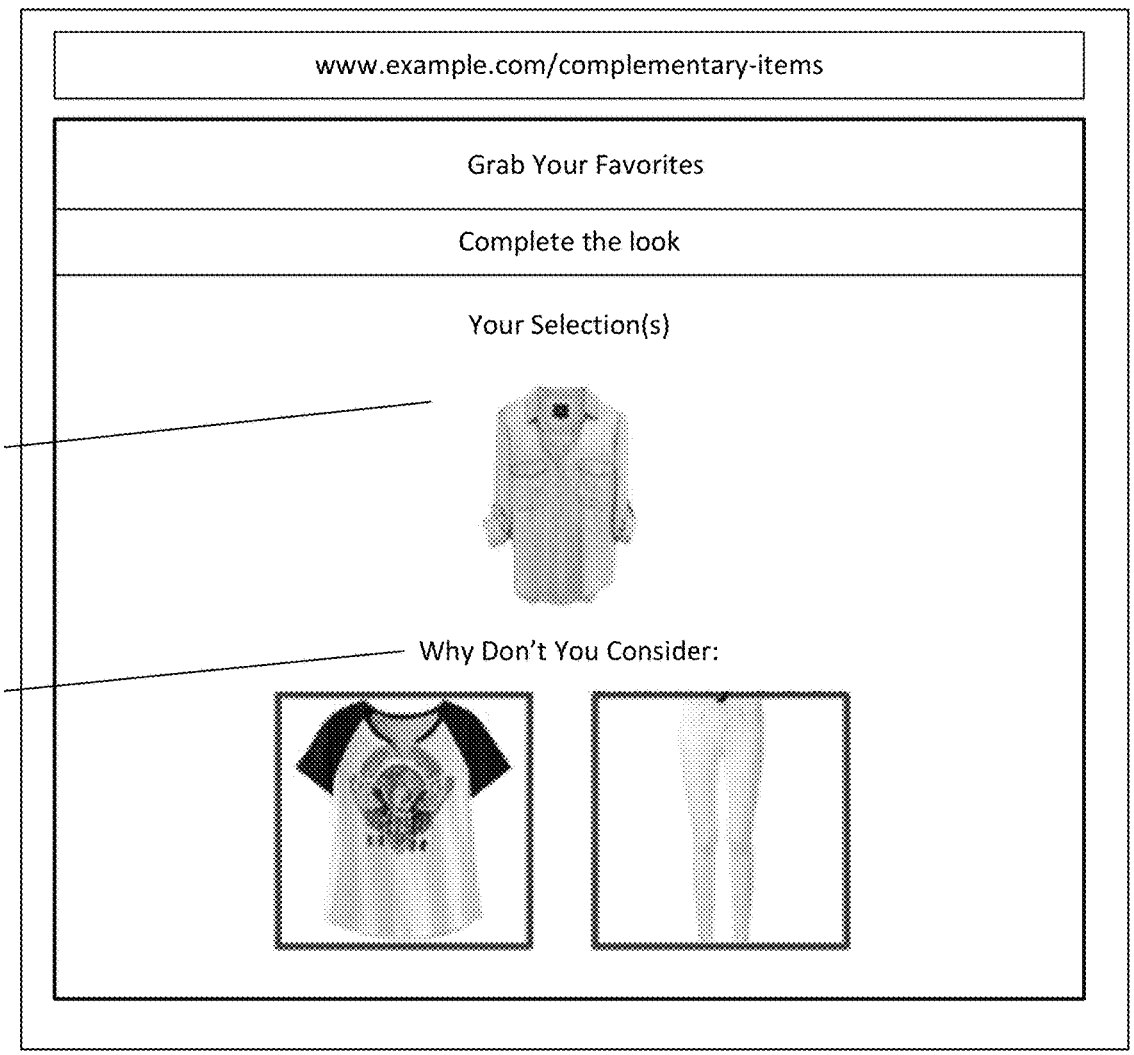
FIG. 7 illustrates a retailer interface useable for providing apparel item recommendations, according to an example implementation.

FIG. 7 illustrates a retailer interface 700 useable for providing apparel item recommendations, according to an example implementation. The retailer interface 700 can be presented within a retailer website, such as may be provided by a retail server 12 as noted above. The retailer interface 700 can be presented to a user and include a set of recommended items of apparel (e.g., based on a user selection of a particular item). As seen in the example, a selection of items 1404 can be presented to a user based on information returned to the retail server 12 from the recommendation engine 112 of system 100, in response to user selection of item 702 (e.g., based on a determination of complementarity). The specific recommendations will change according to which item is selected by the user, as noted above.

Example System

Figure 8:
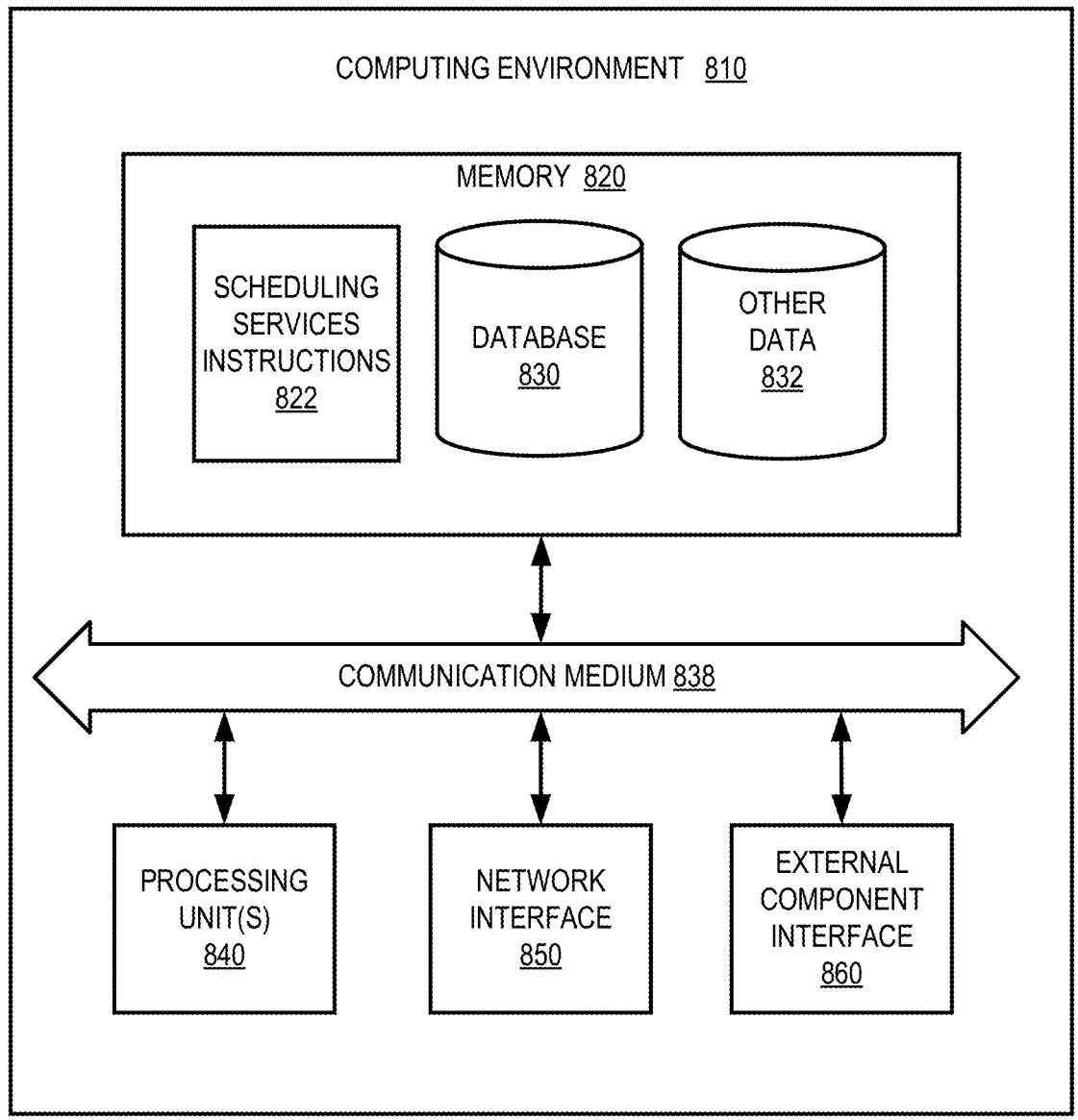
FIG. 8 illustrates an example system with which disclosed systems and methods can be used.

FIG. 8 illustrates an example system 800 with which disclosed systems and methods can be used. In an example, the system 800 can include a computing environment 810. The computing environment 810 can be a physical computing environment, a virtualized computing environment, or a combination thereof. The computing environment 810 can include memory 820, a communication medium 838, one or more processing units 840, a network interface 850, and an external component interface 860.

The memory 820 can include a computer readable storage medium. The computer storage medium can be a device or article of manufacture that stores data and/or computer-executable instructions. The memory 820 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 820 can store various types of data and software. For example, as illustrated, the memory 820 includes scheduling services instructions 822 for implementing one or more aspects of the scheduling services described herein, database 830, as well as other data 832. In some examples the memory 820 can include instructions for generating a website and/or maintaining product information).

The communication medium 838 can facilitate communication among the components of the computing environment 810. In an example, the communication medium 838 can facilitate communication among the memory 820, the one or more processing units 840, the network interface 850, and the external component interface 860. The communications medium 838 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 840 can include physical or virtual units that selectively execute software instructions. In an example, the one or more processing units 840 can be physical products comprising one or more integrated circuits. The one or more processing units 840 can be implemented as one or more processing cores. In another example, one or more processing units 840 are implemented as one or more separate microprocessors. In yet another example embodiment, the one or more processing units 840 can include an application-specific integrated circuit (ASIC) that provides specific functionality. In yet another example, the one or more processing units 840 provide specific functionality by using an ASIC and by executing computer-executable instructions.

The network interface 850 enables the computing environment 810 to send and receive data from a communication network (e.g., network 140). The network interface 850 can be implemented as an Ethernet interface, a token-ring network interface, a fiber optic network interface, a wireless network interface (e.g., WI-FI), or another type of network interface.

The external component interface 860 enables the computing environment 810 to communicate with external devices. For example, the external component interface 860 can be a USB interface, Thunderbolt interface, a Lightning interface, a serial port interface, a parallel port interface, a PS/2 interface, and/or another type of interface that enables the computing environment 810 to communicate with external devices. In various embodiments, the external component interface 860 enables the computing environment 810 to communicate with various external components, such as external storage devices, input devices, speakers, modems, media player docks, other computing devices, scanners, digital cameras, and fingerprint readers.

Although illustrated as being components of a single computing environment 810, the components of the computing environment 810 can be spread across multiple computing environments 810. For example, one or more of instructions or data stored on the memory 820 may be stored partially or entirely in a separate computing environment 810 that is accessed over a network.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A computer-implemented method comprising:
obtaining a pair of images of apparel items;
providing the pair of images as input to a trained neural network, wherein the trained neural network includes a first subnetwork comprising a left branch and a right branch;
processing the pair of images with the trained neural network, wherein processing the pair of images includes:
generating first feature embeddings for a first image of the pair of images using the left branch of the first subnetwork and generating second feature embeddings for a second image of the pair of images using the right branch of the first subnetwork;
using a combiner, generating a combined feature vector of the first feature embeddings and the second feature embeddings by calculating a Hadamard product of the first feature embeddings and the second feature embeddings; and
mapping the combined feature vector to a compatibility score using a readout function of a second subnetwork, the second subnetwork including a fully connected (FC) neural network;
obtaining the compatibility score as output from the second subnetwork of the trained neural network; and
upon determining that the compatibility score is over a predetermined threshold value, recommending that a first apparel item associated with the first image and a second apparel item associated with second image are compatible.

2. The computer-implemented method of claim 1, wherein processing the pair of images with the trained neural network further includes:
incorporating color information into the trained neural network.

3. The computer-implemented method of claim 2, wherein incorporating the color information into the trained neural network includes augmenting the first feature embeddings and the second feature embeddings with color histogram features obtained from the pair of images of apparel items.

4. The computer-implemented method of claim 3, wherein augmenting the first feature embeddings and the second feature embeddings includes concatenating the color histogram features with the Hadamard product of the first feature embeddings and the second feature embeddings.

5. The computer-implemented method of claim 1, wherein processing the pair of images with the trained neural network includes incorporating apparel category information into the trained neural network.

6. The computer-implemented method of claim 5, wherein the apparel category information is incorporated as embeddings of a pair of categories of the apparel items of the pair of images.

7. A computer-implemented method comprising:

receiving a seed item;

for each respective item of a plurality of items in an item collection, determining a compatibility score between the seed item and the respective item, wherein the determining includes:

providing the seed item and the respective item as a pair of images as input to a trained neural network, wherein the trained neural network includes a first subnetwork comprising a left branch and a right branch;

processing the pair of images with the trained neural network, wherein processing the pair of images includes:

generating first feature embeddings for a first image of the pair of images using the left branch of the first subnetwork and generating second feature embeddings for a second image of the pair of images using the right branch of the first subnetwork;

using a combiner, generating a combined feature vector of the pair of images by calculating a Hadamard product of the first feature embeddings and the second feature embeddings of the pair of images;

mapping the combined feature vector to a compatibility score using a readout function of a second subnetwork, the second subnetwork including a fully connected (FC) neural network; and obtaining the compatibility score as output from the second subnetwork of the trained neural network; and providing a subset of the plurality of items recommending an apparel item at a retail website, wherein the compatibility score between each of the subset of the plurality of items and the seed item is above a predetermined threshold value.

8. The computer-implemented method of claim 7, wherein processing the pair of images with the trained neural network further includes incorporating color information into the trained neural network.

9. The computer-implemented method of claim 8, wherein incorporating color information into the trained neural network includes augmenting the feature embeddings of each of the pair of images with color histogram features obtained from the pair of images of apparel items.

10. The computer-implemented method of claim 9, wherein augmenting the feature embeddings of each of the pair of images includes concatenating the color histogram features with the Hadamard product of the feature embeddings of each of the pair of images.

11. The computer-implemented method of claim 7, wherein processing the pair of images with the trained neural network further includes incorporating apparel category information into the trained neural network.

12. The computer-implemented method of claim 11, wherein the apparel category information is incorporated as embeddings of a pair of categories of the apparel items of the pair of images.

13. The computer-implemented method of claim 7, wherein receiving the seed item includes receiving the seed item over the retail website.

14. The computer-implemented method of claim 7, wherein the trained first subnetwork is a siamese network.

15. The computer-implemented method of claim 7, wherein the combiner is further configured to concatenate the Hadamard product with color histogram features extracted from the pair of apparel images.

* * * * *